United States Patent [19]
Sano et al.

[11] Patent Number: 5,375,226
[45] Date of Patent: Dec. 20, 1994

[54] PORTABLE TYPE DATA ENTRY TERMINAL HAVING A KEYBOARD INPUT DEVICE AND A GRAPHIC INPUT DEVICE

[75] Inventors: Shigeaki Sano, Fuchu; Eiichi Tanaka, Koganei; Sunichi Kawashima, Tokyo, all of Japan

[73] Assignee: Toppan Moore Company, Ltd., Tokyo, Japan

[21] Appl. No.: 93,988

[22] Filed: Jul. 20, 1993

Related U.S. Application Data

[63] Continuation of Ser. No. 458,790, Dec. 29, 1989, abandoned.

[30] Foreign Application Priority Data

Dec. 29, 1988 [JP] Japan ................ 63-335493
Dec. 29, 1988 [JP] Japan ................ 63-335495
Dec. 29, 1988 [JP] Japan ................ 63-335497

[51] Int. Cl.⁵ .............. G06F 3/06; G06F 3/033
[52] U.S. Cl. .............. 395/500; 364/DIG. 1; 364/DIG. 2; 364/237.1; 364/237.2; 364/237.5; 364/237.6; 364/237.82; 364/237.85; 364/927.1; 364/927.2; 364/927.5; 364/927.6

[58] Field of Search ............ 364/DIG. 1 MS File, 364/DIG. 2 MS File; 395/100, 800, 472, 400, 500, 155, 275, 600; 340/711, 712, 706, 707, 708, 709, 710; 178/18, 19, 20; 345/10, 13, 14, 55, 59, 112, 113, 121, 123, 124, 125, 128, 131, 127, 156, 168, 173, 174, 179

[56] References Cited

U.S. PATENT DOCUMENTS 4,143,417 3/1979 Wald et al. ............ 364/900
4,151,596 4/1979 Howells ............ 364/900

FOREIGN PATENT DOCUMENTS 0301842 2/1989 European Pat. Off. .

*Primary Examiner*—Robert B. Harrell
*Attorney, Agent, or Firm*—Kenyon & Kenyon

[57] ABSTRACT

The specification of the invention details the invention of a portable type data input terminal which can input a plurality of data in different forms and operates by a battery based power supply.

The portable type data input terminal according to the invention comprises: an input unit to input graphic data and binary data; a unit for receiving the graphic data and binary data from the input unit, for converting the graphic data into the form of a digital signal of the pixels of such graphic data, and for converting the binary data into a form of a corresponding code signal; a control unit for signal processing the outputs of the signal converting apparatus; and a memory device to store the respective data which were processed by the control unit so as to correspond to each other.

14 Claims, 7 Drawing Sheets

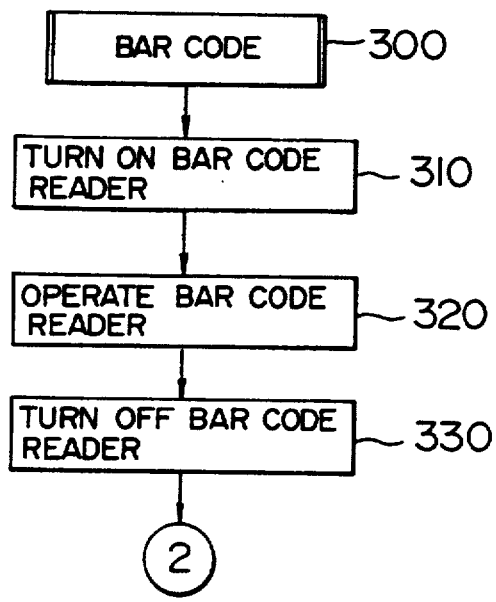
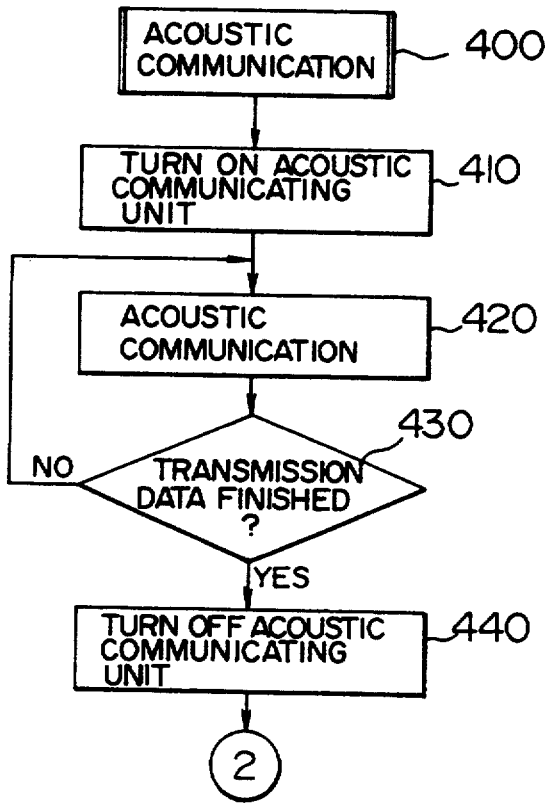
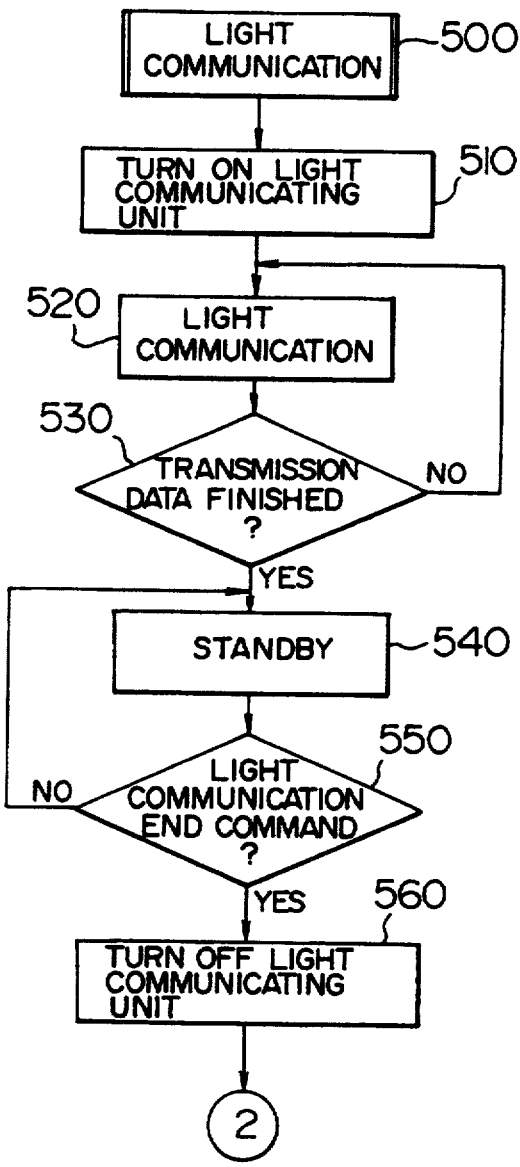

PORTABLE TYPE DATA ENTRY TERMINAL HAVING A KEYBOARD INPUT DEVICE AND A GRAPHIC INPUT DEVICE

This application is a continuation of application Ser. No. 07/458,790, filed on Dec. 29, 1989, now abandoned.

BACKGROUND OF THE INVENTION

The present invention relates to a data input apparatus and, more particularly, to a portable type data input terminal which can input a plurality of data of different types.

In association with the development of the communication technique, a small portable type terminal or data input apparatus is generally used. On the other hand, owing to the spread of computer systems, computers are used for management of the stocks of goods, management works of parcels in the parcel transportation business, and the like.

The portable type data input apparatus is used as a terminal of such a computer system. In the parcel transportation business, each deliveryman has the portable type data input apparatus. After the deliveryman handed a parcel to a customer on the delivery side, he inputs predetermined data to the input apparatus from the keyboard and, further, receives the slip with the acceptance signature of the customer on the delivery side. After completion of the delivery works, the deliveryman ordinarily inputs a series of data which was inputted upon delivery into a host computer installed in the office. Therefore, the data input apparatus has the memory function. The host computer collects and classifies the data from all of the data input apparatuses. A business management system by the computer as mentioned above also executes a similar procedure even for another management of the stocks of goods.

In the business management by the computer system, since data can be inputted by the keyboard, the data can be stored and processed in a digital signal form. Therefore, there is an advantage such that the number of papers or documents can be remarkably reduced.

However, in the conventional portable type data input apparatus, since data is inputted by the keyboard, only what is called code data can be inputted and analog graphic data such as a graphic or hand-written characters cannot be inputted. Therefore, in the case of the acceptance slip or the like which needs a signature, the papers or documents cannot be abolished and the function of the computer system cannot be made the most of.

Moreover, there is demanded a terminal which can satisfy the requirements which are peculiar to the portable type data input apparatus such that a person who uses it can freely carry and operate even at a remote position without a commercially available power source away from the host computer.

SUMMARY OF THE INVENTION

It is an object of the present invention to provide a portable type data input terminal which can input not only ordinary code data but also analog graphic data such as hand-written characters.

Further another object of the invention is to provide a data input terminal which can satisfy the requirements peculiar to a portable type apparatus.

To accomplish the above object, the present invention comprises: an input unit which operates by a power supply by a battery and is used to input figure data and binary data; a unit for receiving the graphic data and the binary data from the input unit, for converting the graphic data into the digital signal form of the pixels, and for converting the binary data into the corresponding code signal form; a control unit for processing output signals of the graphic data converter and binary data converter; and a memory device for storing the respective data processed by the control unit so as to make them correspond to each other.

BRIEF DESCRIPTION OF THE DRAWINGS

FIGS. 6, 7, 8 and 9 are operation flowcharts for the apparatus of FIG. 4.

DESCRIPTION OF THE PREFERRED EMBODIMENTS

An embodiment of the present invention will be described hereinbelow with reference to the drawings.

Figure 1A:
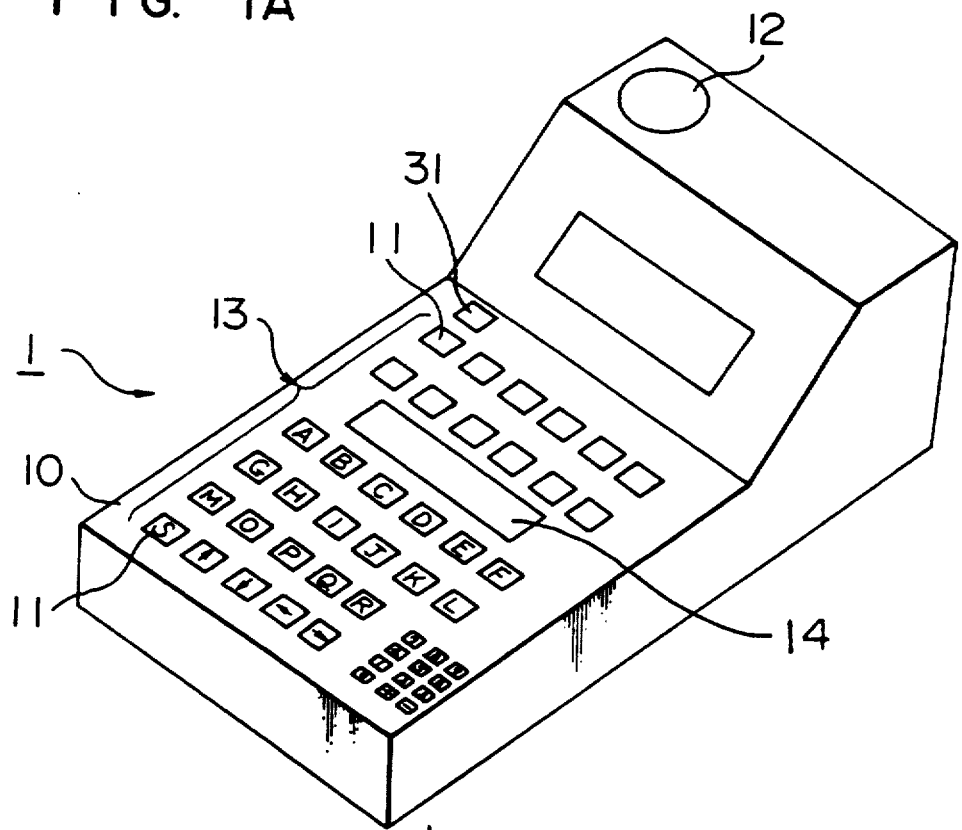
FIGS. 1A and 1B are external views of a portable type data input terminal according to the present invention.

FIG. 1A shows an external perspective view of a portable type data input terminal 1 to which the invention is applied. The terminal 1 operates by using a rechargable battery as a power source. Reference numeral 12 denotes an acoustic coupler; 50 an LCD display unit; and 10 an input unit comprising a membrane type keyboard having a number of key switches 11 and a pad 14 for inputting a hand-written graphic pattern. Reference numeral 31 indicates a power switch for the whole apparatus.

Figure 1B:
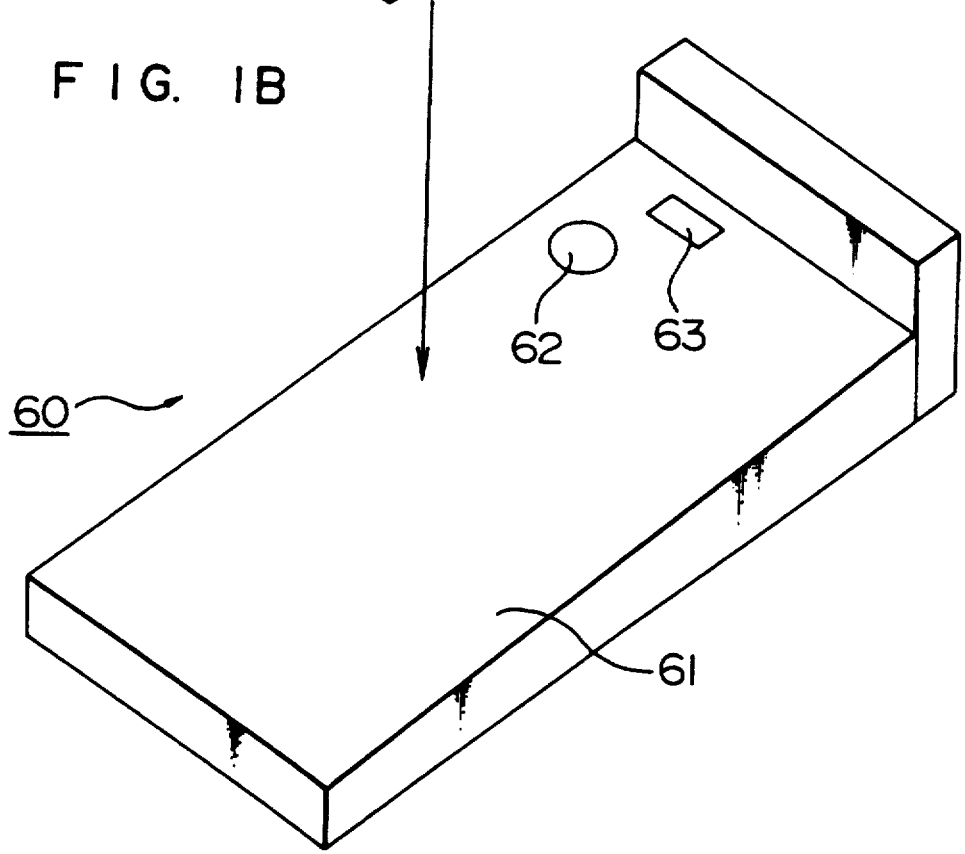

In FIG. 1B, reference numeral 60 denotes a base unit to charge the rechargable battery of the portable type data input terminal 1 by the magnetic coupling system. By putting the portable type data input terminal 1 at a predetermined position on a base plate 61, a power transmitting coil 62 faces a power receiving coil (not shown) of the terminal 1. An electric power is supplied from the base unit 60 to the terminal 1 by the magnetic coupling of those coils. Reference numeral 63 denotes a photocoupler (a light emitting device and photo sensitive device) to communicate with the terminal 1 by using the light as a communication medium. The photocoupler 63 (i.e., the photo sensitive device thereof) receives not only the light communication signal but also, for instance, a photosignal indicative of the completion of the charging operation from the terminal 1.

Figure 2:
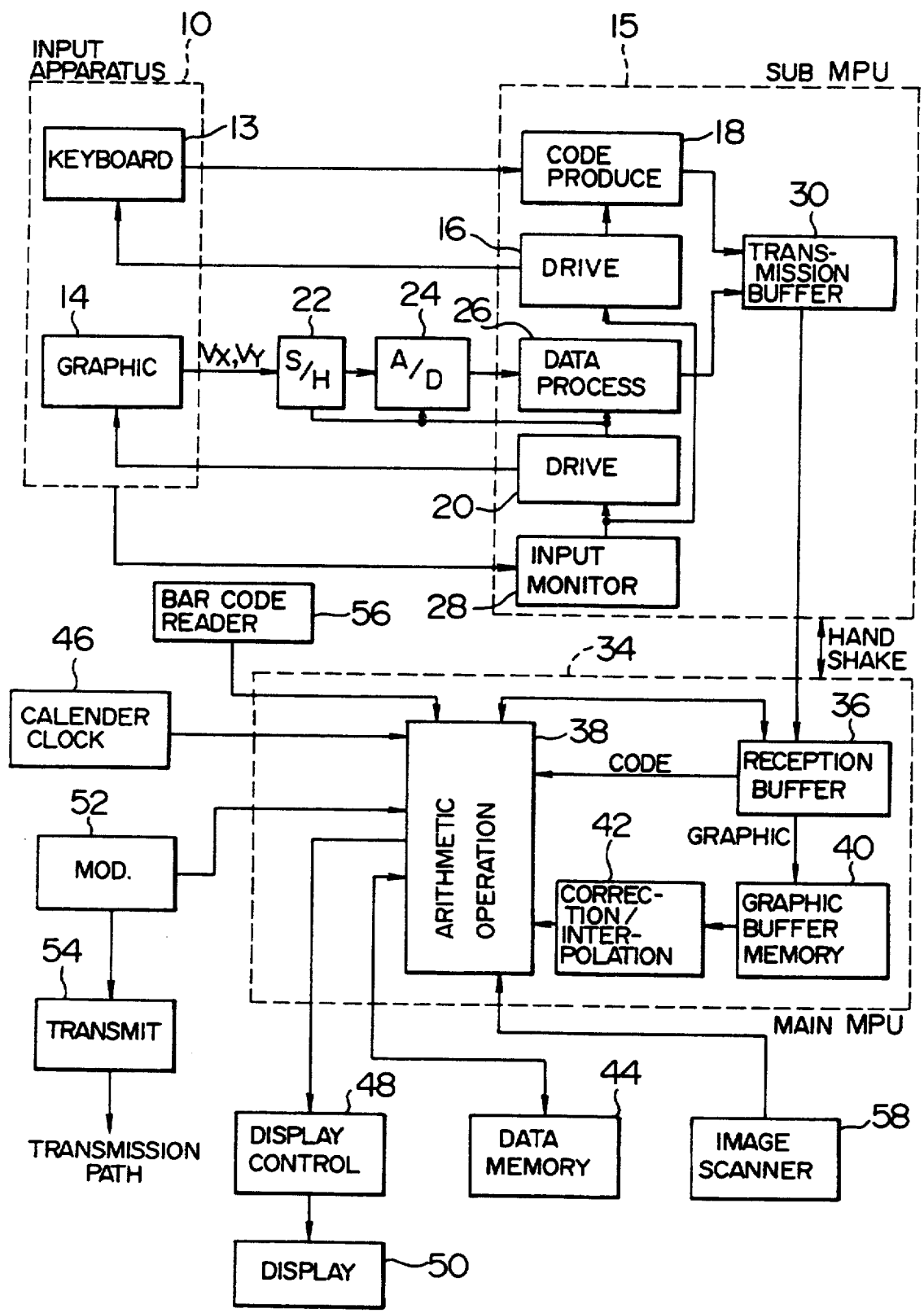
FIG. 2 is a circuit block diagram of an embodiment of a portable type data input terminal according to the invention.

FIG. 2 shows a constructional block diagram of an embodiment of the portable type data input terminal according to the invention. Reference numeral 10 denotes the input apparatus comprising: a keyboard 13 having keys to indicate predetermined working contents, alphabet (or Japanese katakana) keys to input general data, numeral keys (what is called a ten-key), and the like; and the pad 14 to input a hand-written graphic pattern. The input apparatus 10 is driven by a sub control circuit 15. The input data from the input apparatus 10 is processed by the sub control circuit 15 and is converted into the data of a predetermined form. In FIG. 2, the main functions of the sub control circuit 15 are shown as circuit blocks. The sub control circuit 15 comprises, for instance, a microcomputer of eight bits.

The interaction between the input apparatus 10 and the sub control circuit 15 will be practically explained. The keyboard 13 is driven or scanned by a drive circuit 16 and outputs a signal to the output line corresponding to the key operated. A code producing circuit 18 outputs the code corresponding to the output signal. In the embodiment, the code producing circuit 18 outputs 1C to 7F (hexadecimal notation). The code producing circuit 18 also has the chattering preventing function. A well-known structure can be used as the keyboard 13. For instance, it is possible to use a matrix structure in which a number of copper wires are vertically and laterally arranged like a lattice and one key is assigned to each cross point and, in response to the key operation, the copper wires which cross at the position of the operated key are mutually made conductive. Or, it is also possible to use a membrane type keyboard using a sheet resistance.

The hand-written graphic input pad 14 is constructed by what is called a digitizer in which when a pressure is applied onto the surface by a pen or the like, an analog signal indicative of the pressurized position is outputted. As such a pad, it is possible to use a structure disclosed in, for instance, Japanese Patent Application JP-A-60-51928 filed by TOPPAN MOORE COMPANY, LTD. on Aug. 31, 1983, Japanese Patent Application JP-A-61-43332 filed by TOPPAN MOORE COMPANY, LTD. on Aug. 8, 1984 and JP-A-62-139027 filed by MITSUBISHI ELECTRIC CORPORATION on Dec. 13, 1985. The X coordinate direction and the Y coordinate direction of the hand-written graphic input pad 14 are alternately scanned by a drive circuit 20, so that the pad 14 alternately outputs analog signals $V_x$ and $V_y$ indicative of the pressurized position. In accordance with a sample and hold control signal from the drive circuit 20, a sample and hold (S/H) circuit 22 samples and holds the voltages $V_x$ and $V_y$. An A/D converting circuit 24 digitizes the voltage held in the S/H circuit 22 by ten bits. An output of the A/D converting circuit 24 is supplied to a data processing circuit 26. On the basis of a timing signal from the drive circuit 20, the data processing circuit 26 executes the correction of the linearity, normalization, and the like and outputs the coordinate data indicative of the coordinates of the pressurized position.

When a predetermined code (for instance, a signature input code) is inputted from the keyboard 13, the sub control circuit 15 accepts the input from the hand-written graphic input pad 14. That is, the drive circuit 20 starts the driving of the pad 14.

As the kinds of the keys 11 of the keyboard 13, the keys indicative of the working content, the alphabet keys to input general data, the ten-key, and the like are provided. As the keys to indicate the working content, there are provided the keys to designate various items such as departure, arrival, delivery of a parcel, reception of a parcel, start of the rest, end of the rest, supply of the fuel, completion of the fuel supply, encounter with the traffic jam, extinction of the traffic jam, delivery article No., delivery locations (entrance, back door, janitor, neighborhood, etc.), etc. As the other function keys, there are provided a key to indicate the start/end of the signature inputting operation, a key to scroll the display screen, and the like. By depressing proper one of the keys 11, a code signal corresponding to the depressed key is generated by the code producing circuit 18.

During the acceptance of the graphic (signature) input, the input from the keyboard 13 can be also accepted. The sub control circuit 15 stops the acceptance of the graphic input by the input of a signature input end code or the input of either one of a plurality of predetermined codes. The sub control circuit 15 may also stop the acceptance of the graphic input in accordance with a pen-up state of a predetermined period of time or longer.

Reference numeral 28 denotes an input monitoring apparatus to monitor the data inputting operation in the input apparatus 10. When the data inputting operation is detected, the input monitoring apparatus 28 sets the drive circuits 16 and 20 from the power shut-off state to the power-on state or from the standby state to the active state.

The output code of the code producing circuit 18 and the coordinate data X and Y of the data processing circuit 26 are supplied to a transmission buffer 30. The sub control circuit 15 byte transfers the data which was inputted from the input apparatus 10 from the transmission buffer 30 to a main control circuit 34 in a predetermined format. The data communication between the sub control circuit 15 and the main control circuit 34 can be executed by the synchronous communication or the asynchronous communication. In the embodiment, upon byte transfer of the input data from the sub control circuit 15 to the main control circuit 34, one byte of 1C to 7F is assigned to the input data from the keyboard 13, three bytes $D_1$, $D_2$, and $D_3$ are used for the coordinate data of an output of the data processing circuit 26, and the X and Y coordinate data are assigned to the bits $b_7$ to $b_0$ as shown in Table 1. $x_9$ to $x_0$ indicate the X coordinates of the pen touch portion and $y_9$ to $y_0$ denote the Y coordinates. ud denotes the pen-up/pen-down. The value of ud is set to 1 at the time of the pen-down. The bits $b_6$ and $b_2$ of the first byte $D_1$ are not used. The MSB of the first byte $D_1$ of the figure data is certainly set to 1, thereby making it possible to distinguish from the code data.

TABLE 1

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $D_1$ | 1     |       | $x_9$ | $x_8$ | ud    |       | $y_9$ | $y_8$ |
| $D_2$ | $x_7$ | $x_6$ | $x_5$ | $x_4$ | $x_3$ | $x_2$ | $x_1$ | $x_0$ |
| $D_3$ | $y_7$ | $y_6$ | $y_5$ | $y_4$ | $y_3$ | $y_2$ | $y_1$ | $y_0$ |

The main control circuit 34 comprises microcomputer of 16 bits. FIG. 2 shows a circuit block diagram of the main functional elements of the main control circuit 34. The reception data from the sub control circuit 15 is once stored into a receiving buffer 36. The main control circuit 34 first checks the MSB of the one-byte data stored in the receiving buffer 36. When the MSB is 0, this means that the receiving data is the code data. Therefore, the receiving data is directly transferred to an arithmetic operating circuit 38. When the MSB is 1, this means that the receiving data is the graphic data. Therefore, the coordinate data is stored into a graphic buffer memory 40. However, in the receiving buffer 36, if the bit $b_3$ of the first byte $D_1$ of the graphic data, that is, if ud indicates the pen-down, the X coordinate data and the Y coordinate data are stored as they are into the graphic buffer memory 40. If the pen-up operation was continuously executed by a predetermined number of times, for instance, 250 times or more, an end of stroke code is stored into the graphic buffer memory 40.

As mentioned above, although the end of the graphic input operation can be discriminated by the pen-up operations of a predetermined number of times, if the code data of the receiving buffer 36 is the code indicative of the end of the graphic inputting operation, the end of stroke code can be also stored into the graphic buffer memory 40.

The graphic buffer memory 40 can have a memory capacity which can store at least the coordinate data of the input graphic of the graphic input pad 14. In response to the storage of the end of stroke code, a correcting interpolating circuit 42 corrects and interpolates the input graphic by using the data stored in the graphic buffer memory 40 and also executes the coordinate conversion so as to allow the input graphic to be displayed by the liquid crystal display apparatus 50, which will be explained hereinlater. For instance, a change amount of two continuous input points is monitored and if the change amount is larger than the previous change amount by a predetermined value or more, it is regarded as noises. The reason why such a discrimination is performed on the basis of the change amount is to consider the individual difference of the hand-writing speed. In addition to such a noise elimination, an interporating process to interpolate the data between two continuous points and a smoothing process are executed. For display by the LCD unit 50, the data between two continuous points is linearly approximated or linearly interpolated.

The arithmetic operating circuit 38 sequentially stores the code data from the receiving buffer 36 and the graphic data processed by the correcting interpolating circuit 42 into a data memory 44 in accordance with the input order. As the data memory 44, for instance, a non-volatile memory which is backed up by a backup battery different from the main power source is used. If the code input from the keyboard 13 does not need the storage into the memory 44, no data is stored into the memory 44.

For instance, as in the case where a person who carries a terminal inputted a code to specify the content of a special work, in the case of the data input which is preferable to also store the date and/or time data into the memory 44, the main control circuit 34 refers to an output of a calendar clock 46 in accordance with the data input and also stores the data indicative of the year, month, day, hour, minute, and second into the memory 44.

An example of the content stored in the memory 44 is shown in Table 2. Table 2 relates to the example of the parcel delivery works. The deliveryman carries the data input apparatus in the embodiment and inputs the work content data every work. In addition, the deliveryman requests for a person who has received the parcel to write his signature onto the graphic input pad 14. In Table 2, "departure", "delivery", "rest", "end of rest", "entrance", or the like is stored into the memory 44 in a form of the corresponding code signal which is input from the key 11. For "(signature data)", the signature figure which was input from the graphic input pad 14 is stored into the memory 44 in a form of the coordinate data For "delivery No." the number of the article is input.

TABLE 2

| Work | Time | Content |
|---|---|---|
| Departure | 8:35 | |
| Delivery | 9:05 | Entrance<br>Delivery article No.<br>(signature data) |
| Rest | 10:15 | |
| End of rest | 10:30 | |
| ... | ... | |
| ... | ... | |

As a data storing method into the memory 44, it is possible to use a method whereby the data is sequentially stored into the continuous addresses in accordance the input order or a method whereby a table as shown in Table 2 is prepared and the input data is respectively stored into the relevant column in accordance with the content of the input data and the mutual relation. In the case of the latter method, the graphic data itself is continuously stored at another memory location and a pointer indicative of the graphic data, that is, a graphic data memory address is stored into the table. The former method is advantageous from the viewpoint of the memory use efficiency.

In the case of sequentially storing the input data into the continuous addresses in the memory 44 in accordance with the input order, the lengths of the code data and the graphic data are different and the length of the graphic data is generally not constant. Therefore, when the code data and the graphic data are stored into the memory 44, it is necessary to enable those data to be distinguished. For instance, it is sufficient to add a data end code to a group of input data or to add a code indicative of the data length to the head of the input data. Or, a memory area of a predetermined length may be also assigned to the graphic data from the beginning. In this case, means for distinguishing the graphic data from the code data, for instance, a discrimination flag may be provided.

The arithmetic operating circuit 38 supplies the input data of a graphic pattern and a code to the LCD unit 50 through the display control circuit 48 and allows the input graphic pattern to be displayed and also allows the character or character string corresponding to the input code to be displayed.

In the case where the data stored in the memory 44 is transmitted to the outside, for instance, a host computer, the arithmetic operating circuit 38 reads out the storage data in the memory 44 and supplies to a modulating circuit 52. The modulating circuit 52 modulates the data into the signal form suitable for a transmission path which is used. The modulated signal is sent to the transmission path through a transmitting unit 54. In the case of using a public telephone line as a transmission path, for example, an acoustic coupler or a modem is used as the transmitting unit 54. In the case of using a light communication system, for example, a photocoupler is used.

On the other hand, in the case where a bar code for management has already been printed on a delivery parcel, a slip, or the like, the use of a bar code reader 56 is instructed from the keyboard 13 to the main control circuit 34. The data which was read by the bar code reader 56 is sent to the arithmetic operating circuit 38. The code is stored into the memory 44 in a manner similar to the input data from the input unit 10. With the above construction, for instance, it is possible to omit the work such that the ID code of the parcel which was handed to the person who receives on the delivery side is input from the keyboard 13, and the erroneous input can be also prevented.

In the embodiment, the hand-written graphic input pad 14 has been provided as graphic inputting device. However, what is called an image scanner 58 may be also provided. In the case of the image scanner 58, a signature pattern written on another paper is read. However, there is an advantage such that other graphic patterns can be also inputted.

When the main control circuit 34 receives an input cancelling code from the sub control circuit 15, the main control circuit clears the group of input data so far and waits for a new key input. To clarify the group of input data, it is sufficient to input the end of a series of data inputting operations to the main control circuit 34 through the sub control circuit 15 by operating, for instance, a return key.

When the user of the data input unit returned to the office or delivery center or the like, he transmits the storage data in the memory 44 to the host computer by using the transmitting unit 54. Thus, the host computer can receive the detailed work content information of the worker together with the time information.

Although a power source system has been omitted in FIG. 2, the memory 44 obviously needs to hold the storage data even when the main power source is shut off. For this purpose, a volatile memory is used as the memory 44. In place of backing up the memory 44 by using a battery, it is also possible to prepare another memory such as non-volatile memory like EEPROM, magnetic recording medium, or the like which is backed up by battery and to save the storage data of the memory 44 into such a battery backup memory before the main power source is shut off. As a memory medium to hold the data upon power-off, it is possible to use a memory medium such as what is called a memory card which is detachable from the apparatus main body and to which a power source is independently supplied.

As the input unit 10, a flat type keyboard having both of the function of the keyboard 13 and the function of the hand-written graphic input pad 14 can be also used. On the other hand, as the graphic buffer memory 40, it is possible to use a memory to store the bit data corresponding to the horizontal and vertical positions of the graphic input pad. In the latter case, the received coordinate data is not directly stored but the bits of the positions corresponding to the coordinate data are inverted (for instance, 1). The above end of stroke code indicates only the end of the graphic input and is not stored into the graphic memory.

Figure 3:
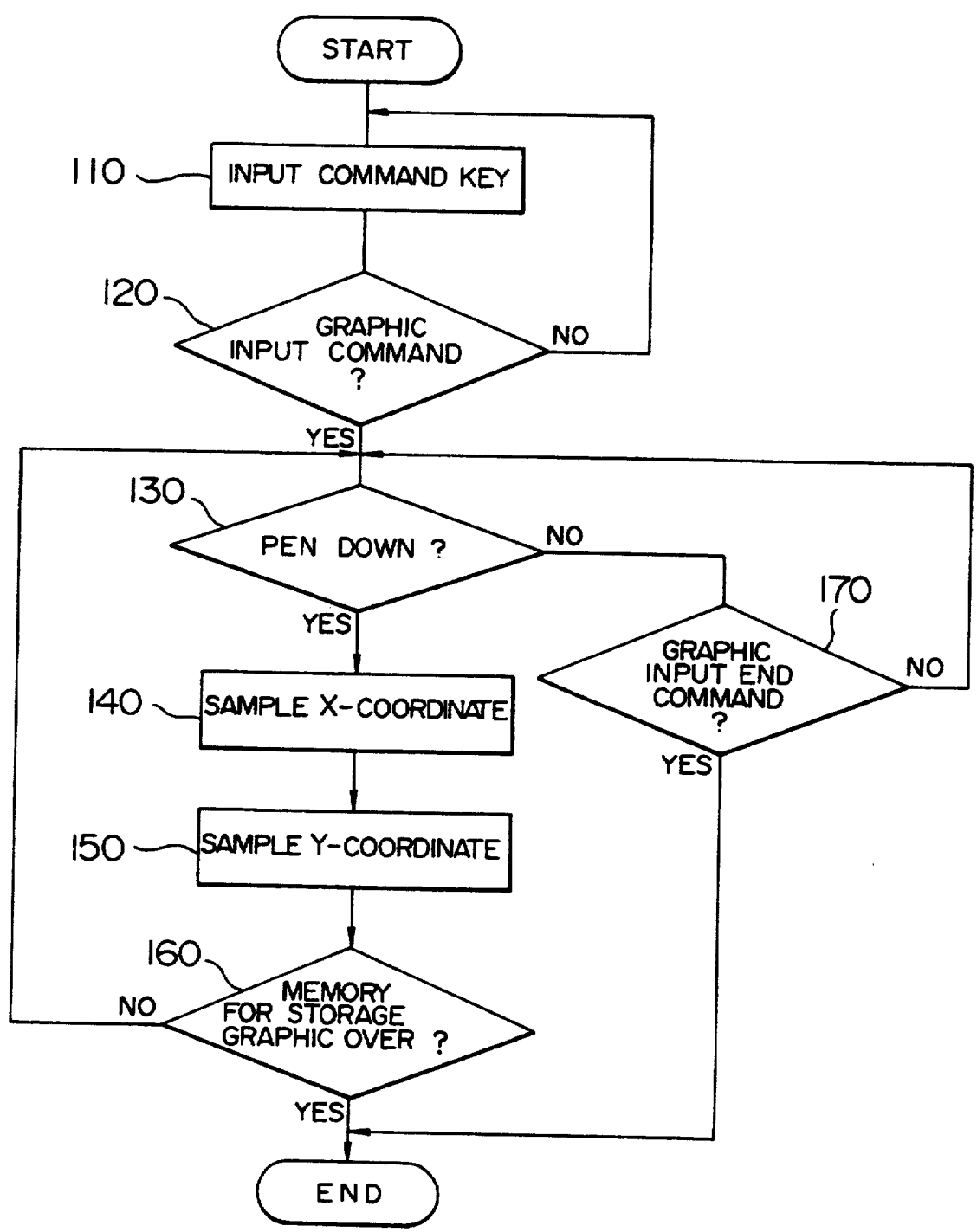
FIG. 3 is an operation flowchart for the apparatus of FIG. 2.

FIG. 3 shows an operation flowchart for fetching graphic data by the sub control circuit 15 and main control circuit 34 in the portable type data input terminal according to the embodiment of the invention.

In step 110, when a graphic input start key in the key switches 11 of the input unit 10 is depressed, the command code corresponding to the key is generated from the code producing circuit 18. In step 120, a check is made to see if the command indicates the image data input or not. If YES, in step 130, a check is made to see if the pen has been put on the graphic input pad 14 or not. If YES, in step 140, the signal of the X coordinate at the pen position is sampled and stored into the data memory 44. In the next step 150, the signal of the Y coordinate is similarly sampled and stored into the memory 44. In step 160, a check is made to see if the graphic data memory area in the data memory 44 is filled with data or not. If an empty memory area still remains in the memory, the processing routine is returned to step 130 and the data of the X and Y coordinates are again fetched and stored into the memory. The above series of data fetching operations are repeated until the graphic data memory area in the memory 44 is filled with the data.

In step 110, if the input key is not the graphic input start key but, for instance, another data key in the key switches 11, it is determined in step 120 that the input key does not indicate the graphic input command. Therefore, the processing routine is returned to step 110 and the apparatus waits for the graphic data input.

If it is decided in step 130 that the pen is not put on the graphic input pad 14, a check is made in step 170 to see if the input command indicates a command indicative of the end of the graphic data input or not. The graphic data input end command is generated by depressing the graphic input end key in the key switches 11 of the input unit 10. Further, if the pen has not been put down on pad 14 more than a predetermined times, the command indicative of the end of the graphic data input is issued. If the graphic input end command is generated, the graphic data inputting process is finished. If the graphic data input end command is not generated, the processing routine is returned to step 130.

The main control circuit 34 fetches the date data of the calendar clock 46 at the time point of the start or end of the graphic inputting operation and stores into the data memory 44.

Although the example of the parcel delivery business has been described above, for instance, the invention can be also obviously applied to other businesses such as management of goods and the like. The invention is particularly effective in the case where the function to check the working content by a third person such as a service superior or the like or to check the working content by a worker himself is necessary or the like. On the other hand, although the invention has been described with respect to the apparatus having only the transmitting function, the invention can be also applied to an apparatus which can execute a bidirectional communication.

A portable type data input terminal in the second embodiment of the invention will now be described. A battery is used as a drive power source in the apparatus according to the second embodiment of the invention in consideration of the case where the apparatus is used at a remote location away from the office in which the host computer is installed. In the description of the first embodiment, a rechargable battery which can be charged has been used as a power source; however, a non-rechargable battery can be also used. When considering the portable type data input terminal, the battery capacity is limited due to a restriction of the weight. On the other hand, there is also a requirement to increase the using time as long as possible. To satisfy such contradictory conditions, an electric power consumption of the apparatus needs to be suppressed as little as possible. On the other hand, as already described in the first embodiment, accessory devices such as bar code reader 56, photocoupler of the transmitting apparatus 54, and the like have relatively large electric power consumptions. Further, as the number of functions at the terminal increases, the electric power consumptions of the accessory devices and the like also increase more and more.

Therefore, the second embodiment intends to provide an input unit of graphic data and code data and to provide an apparatus which can also satisfy those requirements which are peculiar to the portable type data input terminal.

In the second embodiment, a circuit construction of the terminal is divided into a plurality of circuit units every predetermined function and each circuit unit is connected to a power source circuit through an individual switch. In response to the operation of a power switch, a power source is first supplied to the circuit unit of the keyboard system. After that, an electric power is supplied to the circuit unit of the main control in accordance with the input of the keyboard. The main control circuit unit supplies an electric power to the annexed circuit unit as necessary and allows it to execute a predetermined operation. After completion of the operation, the power source is shut off.

As mentioned above, since the electric power supply to each circuit unit is limited to the time when the operation of the circuit unit is necessary, the power consumption of the power source battery can be minimized.

Figure 4:
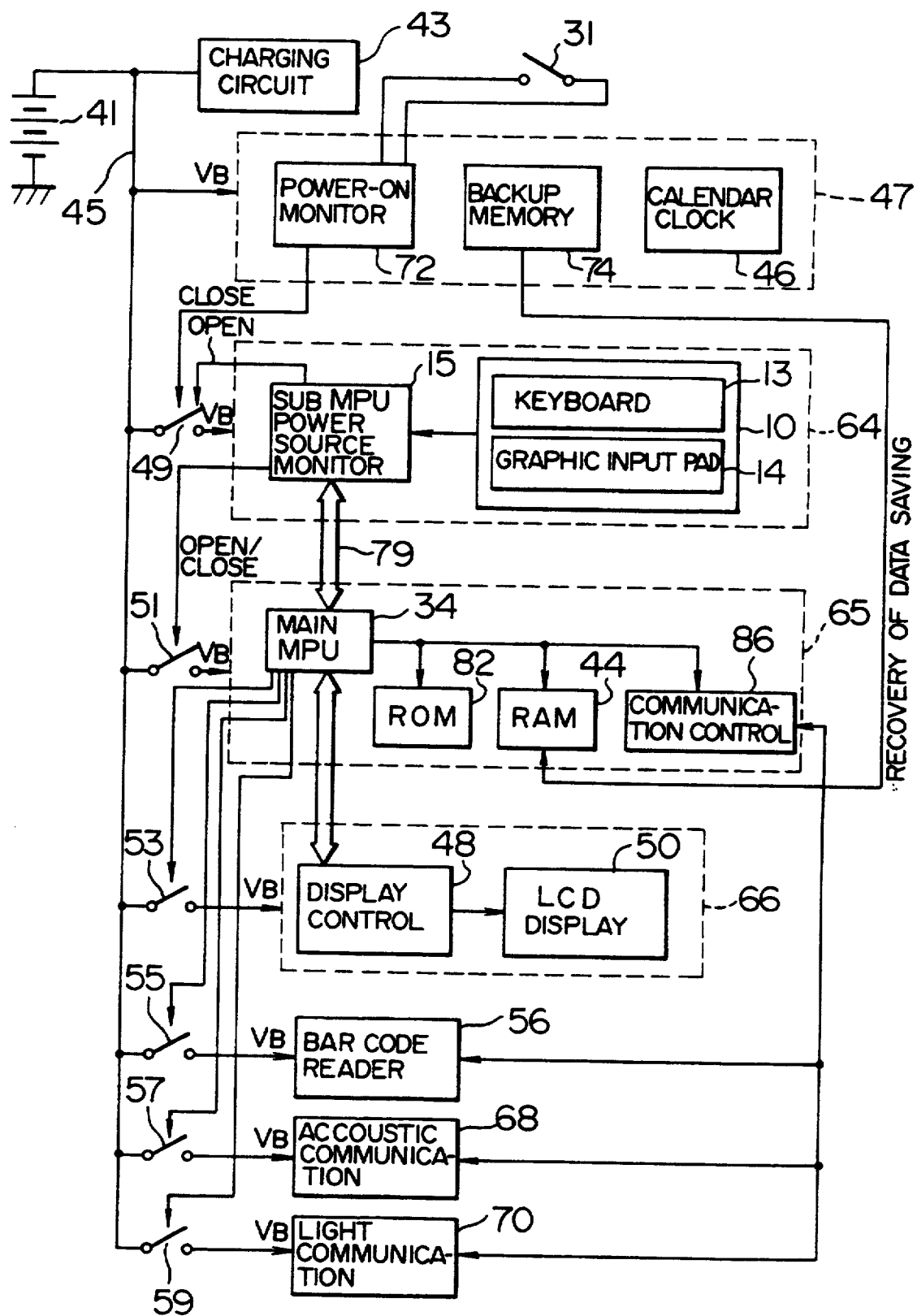
FIG. 4 is a circuit block diagram of another embodiment of a portable type data input terminal according to the, invention.

FIG. 4 is a diagram in the case where a wiring diagram of the power source system was added to the terminal 1 of FIG. 2. The same component elements as those in FIG. 2 are designated by the same reference numerals. Reference numeral 41 denotes a power source battery as a rechargable battery; 43 indicates a charging circuit to charge the battery 41 by an electric power which is sent from the base unit 60; and 45 represents a power source line. A backup unit 47 to which an electric power is always supplied is directly connected to the power source line 45. A sub unit 64, a main unit 65, a display unit 66, the bar code reader 56, an acoustic communicating unit 68, and a light communicating unit 70 are connected to the power source line 45 through power supplying switches 49, 51, 53, 55, 57, and 59, respectively.

The backup unit 47 comprises: a power-on monitoring circuit 72 to monitor the opening/closing state or the operating state of the power switch 31; a backup memory 74 having a memory capacity of about 512 kbits or 1024 kbits; and the calendar clock 46 to output the present time (year, month, day, hour, minute, second) data. The capability of the power source battery 41 and the electric power consumption of the backup memory 74 are set to values such that when the power source battery 41 supplies the electric power to only the backup unit 47, the backup memory 74 can hold the data for at least 48 hours. This is because there is considered a situation such that the storage data in the memory 74 is ordinarily transmitted to the outside within 24 hours. If it is necessary to store the data for a longer time, they are changed to the proper values.

The sub unit 64 comprises: the input apparatus 10; and the sub control circuit 15 for controlling the input unit 10 and producing the data of the on/off inputs of a number of key switches 11 and producing the data of the graphic input from the hand-written graphic input pad 14. The sub control circuit 15 comprises, for instance, a one-chip microcomputer of eight bits. The power supplying switch 49 is closed by a closing signal from the power-on monitoring circuit 72 and is opened by an opening signal from the sub control circuit 15. The sub control circuit 15 monitors an output voltage of the power source battery 41 through the closed power supplying switch 49 and the power source line 45. When the output voltage of the power source battery 41 drops to a level such as to cause a problem in the long-time operation of the backup unit 47, in order to suppress the further consumption of the electric power of the power source battery 41, the sub control circuit 15 sends the opening signal to the power supplying switch 49, thereby shutting off the power supply to the sub unit 64. The sub control circuit 15 also monitors the output voltage of the battery 41 even during the charging operation by the charging circuit 43. After completion of the charging operation, the input unit 10 informs the completion of the charging operation to the base unit 60, thereby allowing the charging of the battery 41 to be stopped.

The main unit 65 comprises: the main control circuit 34 to execute various control operations; a read only memory (ROM) 82; the random access memory (RAM) 44; the bar code reader 56; and a communication control circuit 86 to control the communication between the acoustic communicating unit 68 and the light communicating unit 70. The main control circuit 34 comprises, for example, microcomputer of 16 bits and controls the display unit 66, the bar code reader 56, and the data communication between the acoustic communicating unit 68 and the light communicating unit 70. The main control circuit 34 also has a data communication path between the main control circuit 34 and the sub control circuit 15. A data communication path is also provided between the main control circuit 34 and a display control circuit 48, which will be explained hereinafter, of the display unit 64. The synchronous or asynchronous data communication is executed through those data communication paths. Operation programs of the main control circuit 34 and the necessary data are stored in the ROM 82. The keyboard input data from the sub unit 64, the present date data from the calendar clock 46, the communication data for the acoustic communicating unit 68 and the light communicating unit 70, and the like are stored into the RAM 44.

When the sub control circuit 15 determines that no problem occurs even if the power source of the main unit 65 is shut off due to the data communication with the main control circuit 34, the sub control circuit 15 supplies the opening signal to the switch 51, thereby opening the switch 51. When the output voltage of the battery 41 is set to a predetermined value or more and predetermined inputting operation is executed by the keyboard 13 and the operation of the main unit 65 is necessary, the sub control circuit 15 supplies the closing signal to the switch 51, thereby making the main unit 65 operative. On the other hand, if the operation of either one of the display unit 66, bar code reader 56, acoustic communicating unit 68, and light communicating unit 70 is necessary, the main control circuit 34 closes the corresponding one of the power supplying switches 53, 55, 57, and 59. If the operation becomes unnecessary, the main control circuit 34 opens the corresponding switch. By finely controlling the power supply as mentioned above, the electric power consumption of the power source battery 41 can be suppressed as small as possible.

The display unit 66 includes the LCD unit 50 and the display control circuit 48 to control the LCD unit 50. The display control circuit 48 allows the data transferred from the main control circuit 34 to be displayed by the LCD unit 50. The liquid crystal display unit 50 uses a liquid crystal material of a super twist type having a high luminance and a high angle of visibility. The luminance can be adjusted to eight levels by an electronic volume.

The bar code reader 56 comprises a bar code reading circuit, a control circuit thereof, and a communicating circuit to communicate with the outside. The acoustic communicating unit 68 has the acoustic coupler 12 and a modem (modulating/demodulating apparatus). The light communicating unit 70 has a photocoupler (a light emitting device and a photo sensitive device) which faces the photocoupler 63 of the base unit 60 when the terminal 1 is put onto the base unit 60. The completion of the charging of the power source battery 41 is informed to the base unit 60 by the photocoupling between the light emitting device of the light communicating unit 70 and the photo sensitive device of the photocoupler 63 of the base unit 60.

The operations of the respective sections in the portable type data input terminal 1 in FIG. 4 for the time interval from the start of the use of the terminal 1 to the end thereof will now be sequentially described. Prior to using, if the power source switch 31 is turned off, as already described above, the power source is supplied to only the backup unit 47 and no power source is supplied to the other sub unit 64, main unit 65, display unit 66, bar code reader 56, acoustic communicating unit 68, and light communicating unit 70. That is, the switches 49, 51, 53, 55, 57, and 59 are open.

When the power source switch 31 is depressed, the power-on monitoring circuit 72 detects it and supplies the closing signal to the switch 49, thereby setting the sub unit 64 into the power supplying state. The sub control circuit 15 executes the self-diagnosis including the check of the output voltage of the battery 41. If the result of the self-diagnosis is satisfactory, the sub control circuit 15 supplies the closing signal to the power supplying switch 51 of the main unit 65. If it is unsatisfactory, the sub control circuit 15 supplies the opening signal to the self power supplying switch 49, thereby shutting off the power supply. The sub control circuit 15 also always monitors the inputting state of the keyboard 13 and transfers the key input or graphic data input to the main control circuit 34 of the main unit 65 through a data communication path 79.

When the switch 51 is closed and the power source voltage is applied to the main unit 65, the main control circuit 34 first establishes a communicating procedure, that is, executes the hand shaking with the sub control circuit 15 through the communication path 79 on the basis of a predetermined procedure. When the hand shaking could be established between both of the main and sub control circuits, the main control circuit 34 executes a self-diagnosis such as a memory check and the like. If the hand shaking cannot be established or in the case where the main control circuit 34 detected an inconvenience by the self-diagnosis, the sub control circuit 15 supplies the opening signal to the switch 51 and shuts off the power supply to the main unit 65. Only when the hand shaking between the sub control circuit 15 and the main control circuit 34 is established and the good result of the self-diagnosis of the main control circuit 34 is obtained, the main control circuit 34 operates in accordance with the main program in the ROM 82 and can make operative all of the functions of the portable type data input terminal 1. However, the main control circuit 34 is ordinarily set in the standby mode of a low electric power consumption.

For instance, if something should be displayed, the main control circuit 34 is set into the active mode by a command from the sub control circuit 15 and supplies the closing signal to the switch 53, thereby supplying the power source to the display unit 64. The necessary data is transferred to the display control circuit 48. The display control circuit 48 allows the necessary data to be displayed by the LCD unit 50 in accordance with the transferred necessary data. After the data was displayed for a predetermined time, in order to prevent the further electric power consumption, the main control circuit 34 opens the switch 53, thereby shutting off the power supply to the display unit 66.

When data is input from the keyboard 13, the input data is processed by the sub control circuit 15 and is transferred to the main control circuit 34 through the signal communication path 79. Prior to transferring the data, the main control circuit 34 is set from the standby mode to the active mode by a command from the sub control circuit 15. In accordance with the content of the data from the sub control circuit 15, the main control circuit 34 stores the data into the RAM 44 and controls the display unit 66, bar code reader 56, acoustic communicating unit 68, and light communicating unit 70.

In the case of making the bar code reader 56 and the acoustic communicating unit 68 or light communicating unit 70 operative, the main control circuit 34 closes the corresponding switches 55, 57, and 59 to thereby enable the electric power to be supplied. The data communication is executed between the bar code reader 56 and the acoustic communicating unit 68 or the light communicating unit 70 through the communication control circuit 86. After completion of the necessary data transfer, the main control circuit 34 supplies the opening signal to the closed switch among the switches 55, 57, and 59, thereby shutting off the electric power supply path. The data obtained from the bar code reader 56 is stored into the RAM 44.

If no data is input from the keyboard 13 for a predetermined period of time the sub control circuit 15 inquires the permission or inhibition of the power shut-off to the main control circuit 34. In accordance with the response indicative of the permission of the power shut-off which is returned from the main control circuit 34, the sub control circuit 15 supplies the opening signal to the switch 51 and shuts off the power supply to the main unit 65. In response to such an inquiry, if the power supply may be shut off, the main control circuit 34 first saves the storage data in the RAM 44 into the backup memory 74 and, thereafter, sends the signal indicative of the permission of the power shut-off to the sub control circuit 15. Thus, the necessary data is held and when the power source is supplied to the main unit 65 later, the data can be again stored into the RAM 44 in the original state.

In the above embodiment, the memory 74 only for the backup has been provided separately from the RAM 44. However, it is also possible to construct in a manner such that the RAM 44 or a part thereof is used as a battery backup memory or a non-volatile memory and even when the switch 51 is opened, the saving operation into the memory 74 is not executed. On the other hand, the data which needs to be backed up is always stored into the backup memory 74 instead of the RAM 44 or may be written into the backup memory 74 together with the storage into the RAM 44. With such a construction, it is possible to eliminate the work to save the storage data in the RAM 44 into the backup memory 74 when the power supply of the main unit 65 is shut off.

Figure 5:
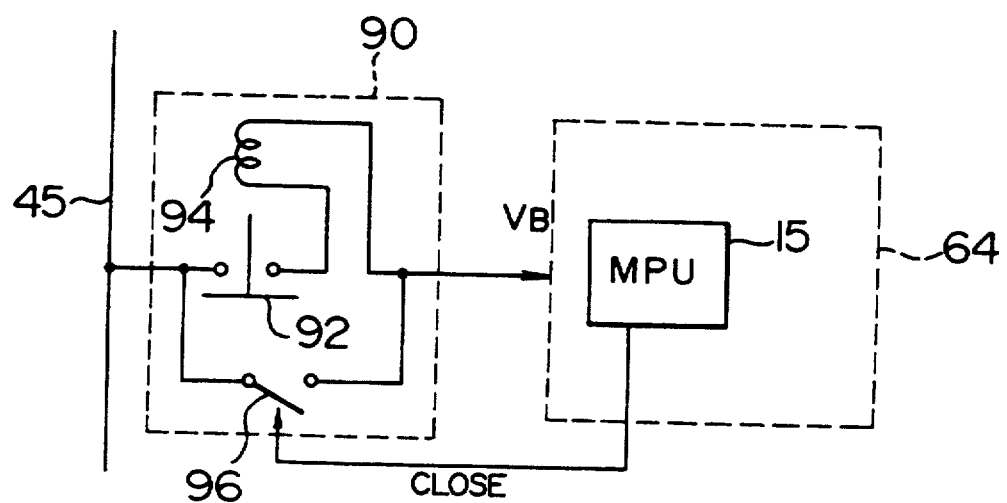
FIG. 5 is a circuit diagram of a self-holding type switching unit which is used in the apparatus of FIG. 4.

The sections of the power source switch 31, power-on monitoring circuit 72, and power supplying switch 49 in the above embodiment can be also changed as shown in FIG. 5 by using a self-holding type switching apparatus. The same component elements as those in FIG. 4 are designated by the same reference numerals. Reference numeral 90 denotes a self-holding type switching unit; 92 indicates a switch which is pressed in the opening direction by a spring; 94 an electro-magnetic coil to keep the switch 92 in the closed state upon current supply; and 96 a normally off type switch. The switch 96 is connected so as to bypass the current path of the switch 92 and the electro-magnetic coil 94. When the switch 92 is closed against the spring force, it is held in the closed state by the electro-magnetic force of the electro-magnetic coil 94. The switch 92 functions as a power switch. To set the switching unit 90 into the open state from the sub control circuit 15, it is sufficient to apply a short pulse to the switch 96 to thereby instantaneously close it. No current flows through the current path of the switch 92 and coil 94 due to the closure of the switch 96. The switch 92 is opened by the spring force. Since the switch 96 is instantaneously closed, the switching unit 90 is set into the open state and the electric power supply to the sub unit 64 is shut off.

Figure 6:
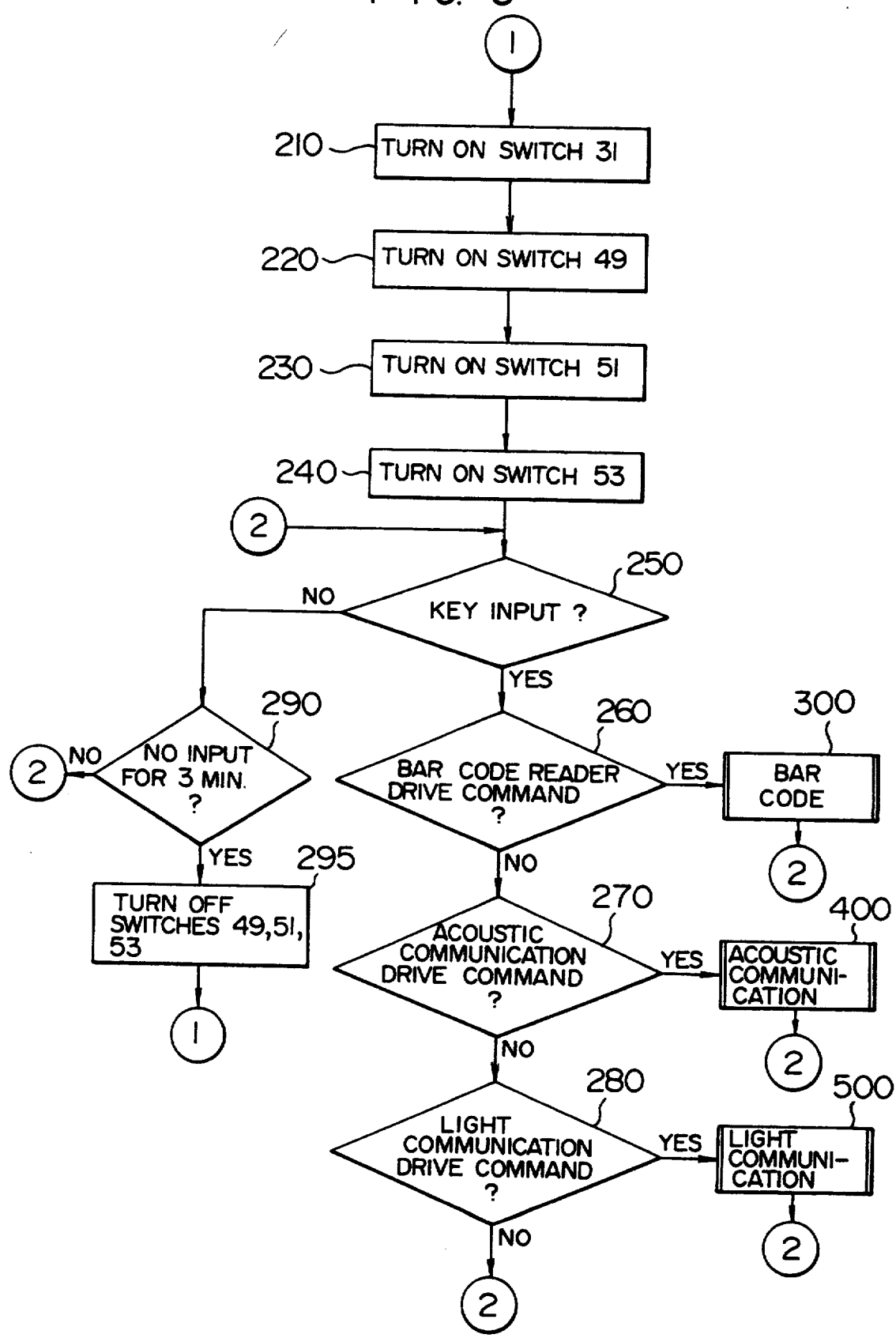

A connection control method of a power source to each unit in the embodiment shown in FIG. 4 will now be described with reference to a flowchart of FIG. 6.

In step 210, the power switch 31 is turned on. In step 220, the power-on monitoring circuit 72 turns on the power supplying switch 49 to the sub unit 64 in response to the turn-on of the switch 31. In this state, the sub control circuit 15 is set into the standby mode and can receive the input from the keyboard 13 or graphic data input pad 14. In step 230, if predetermined data has been input from the keyboard 13 and the operation of the main control circuit 34 is necessary due to such an input, the sub control circuit 15 turns on the power supplying switch 51 to the main unit 65. In step 240, the main control circuit 34 turns on the power supplying switch 53 to the display unit 66. In step 250, a check is made to see if the key input from the keyboard 13 has been performed or not. If there is a key input, a check is made in step 260 to see if a command to drive the bar code reader has been input or not. Such a command is generated when the bar code drive instruction key 11 of the keyboard 13 is depressed. If the bar code drive command has been generated, in step 300, the power source of the bar code reader 56 is connected. If the bar code reader drive command is not generated, a check is made in step 270 to see if an acoustic communicating unit drive command has been input or not. Such a command is generated when the acoustic communication start key 11 of the keyboard 13 is depressed. If the acoustic communicating unit drive command has been input, the power source of the acoustic communicating unit 68 is connected in step 400. If the acoustic communicating unit drive command is not generated, a check is made in step 280 to see if a light communicating unit drive command has been generated or not. Such a command is generated when the light communication start key 11 of the keyboard 13 is depressed. If the light communicating unit drive command has been generated, the power source of the light communicating unit 70 is connected in step 500. If the light communicating unit drive command is not generated, the processing routine is returned to step 250. If there is no key input in step 250, a timer is started in step 290. If no key input is executed even after, for example, three minutes elapsed in the timer, in step 295, the switches 49, 51, and 53 are turned off and the power supply to the sub unit 64, main unit 65, and display unit 66 is stopped. Then, the processing routine is returned to step 210. If there is a key input within three minutes in step 290, the processing routine is returned to step 250.

Processing routines in steps 300, 400, and 500 in FIG. 6 will now be described with reference to FIGS. 7, 8, and 9.

In step 300, a power control routine of the bar code reader is started. In step 310, the power supplying switch 55 of the bar code reader 56 is turned on. In step 320, the operation of the bar code reader 56 is executed. In step 330, when the operation is finished, the power supplying switch 55 of the bar code reader 56 is turned off in response to an instruction from the key 11 and the processing routine is returned to step 250.

In step 400, the power control routine of the acoustic communicating unit 68 is started. In step 410, the power supplying switch 57 of the acoustic communicating unit 68 is turned on. In step 420, the acoustic communication is started. In step 430, a check is made to see if the acoustic communication has been finished or not. If a communication end signal has been generated, it is determined that the communication was finished. Upon completion of the communication, in step 440, the power supplying switch 57 of the acoustic communicating unit 68 is turned off and the processing routine is returned to step 250.

In step 500, the power control routine of the light communicating unit 70 is started. In step 510, the power supplying switch 59 of the light communicating unit 70 is turned on. In step 520, the light communication is started. In step 530, a check is made to see if no light communication data exists or not. Upon completion of the light communication, in step 540, the apparatus waits for a further communication request. In step 550, a check is made to see if the communication request indicates the light communication end command or not. In the case of the light communication end command, the power supplying switch 59 of the light communicating unit 70 is turned off in step 560. The processing routine is returned to step 250. If NO in step 550, the processing routine is returned to the standby state in step 540.

The embodiment can be also applied to an electric/electronic apparatus which is driven by a bttery such as a portable type data input unit or the like which immediately transmits the input data by wireless.

Although the switches 49, 51, 53, 55, 57, and 59 in the above embodiment may be the mechanical switches such as electro-magnetic switches or the like, semiconductor switches are preferable in terms of the life. On the other hand, the self-holding type switching unit 90 is not limited to the structure shown in the diagram but may be an apparatus having the self-holding property by using a semiconductor circuit.

We claim:

1. A portable type data input terminal, comprising:
   a graphic input device adapted to input a hand-written signature image to acknowledge a transaction, and to capture said hand-written signature image as data including coordinate data of pixels forming said hand-written signature image;

a data input device adapted to input character information to manage said coordinate data;

a data converter adapted to receive said character information from said data input device and to convert said character information into code data;

a controller adapted to process said coordinate data and said code data from said data converter; and a memory adapted to store data processed by said controller, said memory storing said coordinate and said code data in such a manner that said coordinate data is associated with code data for management of the hand-written signature image corresponding to said coordinate data.

2. The portable type data input terminal according to claim 1, further comprising a battery which supplies said terminal with electric power.

3. The portable type data input terminal of claim 2, wherein said controller includes a first unit to control the data input device and the signal converter and a second unit to control the storage of the data into memory in response to data from the first unit.

4. The portable type data input of claim 3, further having first and second switches which can respectively independently open and close electric power lines between the battery and the first and second units, and wherein said first unit includes a switch control adapted to close the second switch in response to the data input in the data input device.

5. The portable type data input terminal of claim 4, wherein said first unit further includes a voltage monitor monitoring whether a voltage of the battery is set to a predetermined value and wherein said switch control closes the second switch when the voltage of the battery is set to the predetermined value and there is a data input in the data input device.

6. The portable type data input terminal of claim 5, wherein said first unit further includes a data detector detecting that there is no data input in the data input device for a predetermined period of time and means for determining a permissibility of a power shut-off to the second unit, and said second unit further includes means for designating the permissibility or inhibition of the power shut-off to the first unit in response to an inquiry, from said means for determining and said first unit includes, a first switch controller adapted to close the first switch in a case where the data input in the data input device does not exist for said predetermined period of time and when the second unit indicates the power shut-off is permitted.

7. The portable type data input terminal of claim 6, further including, a bar code reader adapted to read an external bar code and supplying data to the second unit, and a data communicating device which is controlled by the second unit and executes transmission and reception of data with an external computer.

8. The portable type data input terminal of claim 7, wherein said data communicating device transfers data via a telephone communication line.

9. The portable type data input terminal of claim 8, wherein said data communicating device accepts data in acoustic signal or light signal form.

10. The portable type data input terminal of claim 1, further comprising a second data input device adapted to input character data representing code data for management of said coordinate data wherein said character data is previously inputted to said second data input device and stored in said memory.

11. The portable type data input terminal of claim 10, wherein said second data input device includes at least a bar code reader and data communicating device adapted for receiving character data in the form of an acoustic signal or a light signal.

12. The portable type data input terminal of claim 1, wherein said data input device includes a keyboard device.

13. The portable type data input terminal of claim 1, wherein said character data include information concerning said transaction.

14. The portable type data input terminal of claim 1, further comprising a timer adapted to produce date and time data when said graphic data of the hand-written signature or said character data are inputted, wherein said memory stores said date and time data in association with said code data and said coordinate data representing the hand-written signature.

* * * * *

UNITED STATES PATENT AND TRADEMARK OFFICE
CERTIFICATE OF CORRECTION

PATENT NO. : 5,375,226                  Page 1 of 3
DATED : December 20, 1994
INVENTOR(S) : Shigeaki Sano, et al It is certified that error appears in the above-indentified patent and that said Letters Patent is hereby corrected as shown below:

| Column | Line | |
|---|---|---|
| 1 | 18 | Change "stocks" to --stocking--. |
| 1 | 19 | Change "works" to --of the routing--. |
| 1 | 25 | Change "handed" to --hands--. |
| 1 | 49 | Change "abolished" to --dispensed with--. |
| 2 | 50 | Change "An electric" to --Electric--. |
| 3 | 67 | Change "extinction" to --elimination--. |
| 4 | 45 | Change "certainly" to --always--. |
| 5 | 27 | Change "noises." to --noise.--. |
| 5 | 30-31 | Change "interporating" to --interpolating--. |
| 5 | 48 | Change "inputted" to --inputs--. |
| 5 | 60 | After "data" insert --for--. |

UNITED STATES PATENT AND TRADEMARK OFFICE
CERTIFICATE OF CORRECTION

PATENT NO. : 5,375,226            Page 2 of 3
DATED : December 20, 1994
INVENTOR(S) : Shigeaki Sano, et al It is certified that error appears in the above-indentified patent and that said Letters Patent is hereby corrected as shown below:

| Column | Line | |
|---|---|---|
| 6 | 51 | After "supplies" insert --it--. |
| 7 | 2 | Change "such that" to --wherein--. |
| 7 | 21 | Change "returned" to --returns--. |
| 8 | 24 | Before "times" insert --number of--. |
| 8 | 60 | Change "using time" to --operating time--. |
| 8 | 62 | Change "suppressed as little" to --minimized as much--. |
| 9 | 10 | Before "every" insert --corresponding to--. |
| 9 | 14 | Before "electric" delete "an". |
| 9 | 31 | Before "electric" delete "an". |
| 9 | 33 | After "which" delete "an". |

UNITED STATES PATENT AND TRADEMARK OFFICE
CERTIFICATE OF CORRECTION

PATENT NO. : 5,375,226
DATED : December 20, 1994
INVENTOR(S) : Shigeaki Sano, et al It is certified that error appears in the above-indentified patent and that said Letters Patent is hereby corrected as shown below:

| Column | Line | |
|---|---|---|
| 10 | 12 | Change "informs" to --indicates-- |
| 10 | 61 | Change "suppressed as small" to --minimized as much--. |
| 11 | 13-14 | Change "is informed" to --is indicated--. |
| 14 | 51 | Change "bttery" to --battery--. |

Signed and Sealed this

Sixteenth Day of May, 1995

Attest:

BRUCE LEHMAN

Attesting Officer

Commissioner of Patents and Trademarks